United States Patent Office 2,765,264
Patented Oct. 2, 1956

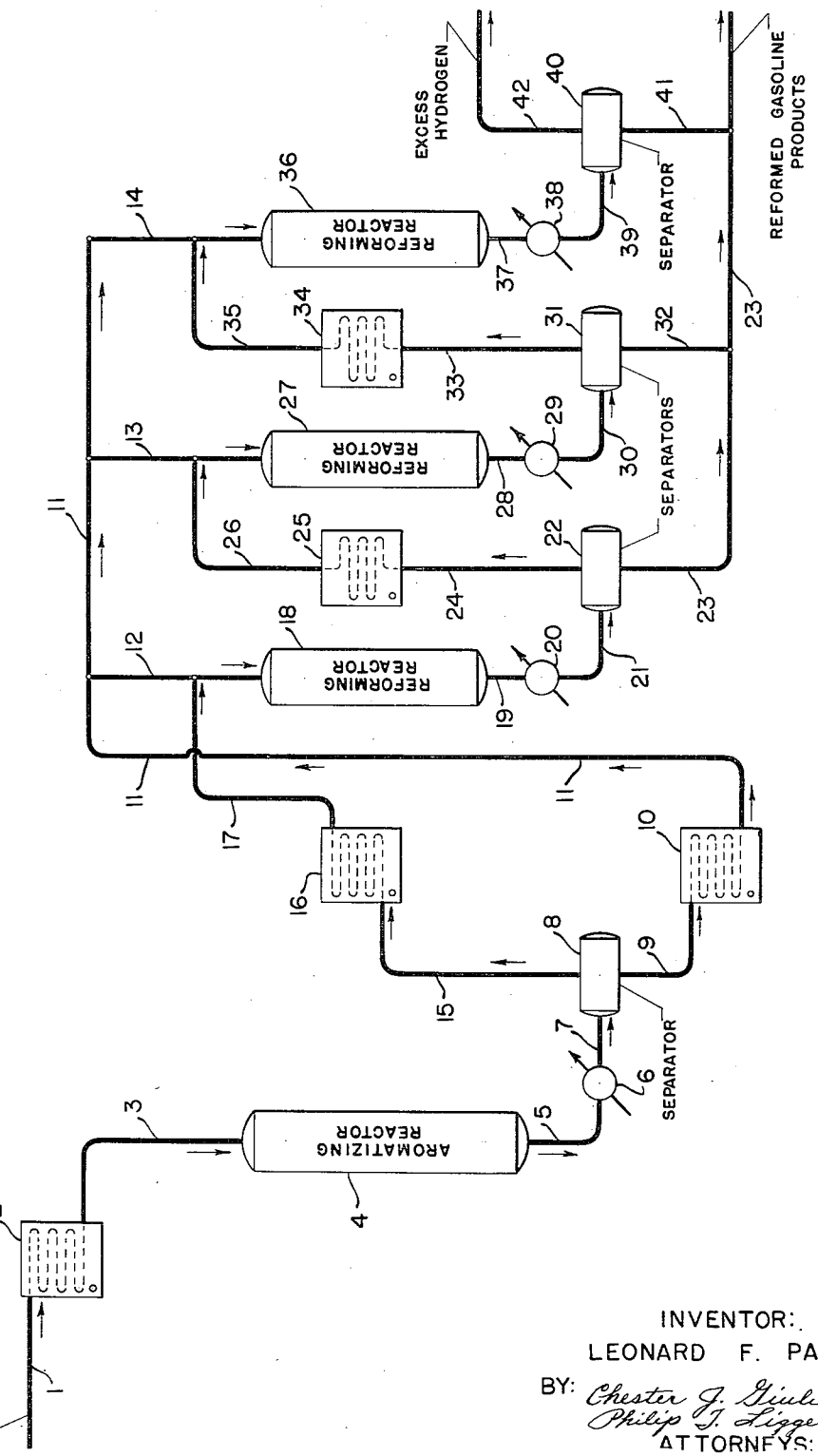

2,765,264

REFORMING WITHOUT RECYCLE HYDROGEN

Leonard F. Pasik, Chicago, Ill., assignor to Universal Oil Products Company, Chicago, Ill., a corporation of Delaware Application March 22, 1952, Serial No. 277,935

6 Claims. (Cl. 196—50)

This invention relates to the conversion of hydrocarbon fractions containing naphthenes and paraffins and boiling approximately within the gasoline range. It is more specifically concerned with a particular combination of mutually related and inter-dependent steps for the reforming of a gasoline fraction.

The term "reforming" is well-known in the petroleum industry and refers to the treatment of a gasoline fraction to improve the anti-knock characteristics thereof. A gasoline fraction may be a full boiling range gasoline having an initial boiling point within the range of from about 50° to about 100° F. and an end boiling point within the range of from about 350° to about 425° F., or it may be any selected fraction thereof, as the naphtha fraction which will have an initial boiling point within the range of from about 150° to about 250° F. and an end boiling point of from about 350° to about 425° F.

The present invention is particularly applicable to the reforming of straight run gasolines or natural gasolines or fractions thereof which contain naphthenes and straight chain or slightly branched chain paraffins as well as varying amounts of the aromatic hydrocarbons. Best results are obtained in reforming when the naphthenic hydrocarbons are converted to aromatics, the straight chain or slightly branched chain hydrocarbons are cyclized to form aromatics, and a controlled type of cracking occurs which converts the heavier straight chain or slightly branched chain paraffins which have low anti-knock characteristics to lighter straight chain or slightly branched chain paraffins which have higher anti-knock characteristics. In addition, various other concomitant reactions occur such as isomerization, hydrogen transfer, etc., which all tend to improve the octane value of the product.

It is highly desirable to effect each of these reactions under specifically controlled conditions to obtain optimum results. This is obtained in the present invention by a proper choice of catalyst for each of the steps as well as carrying out the reactions at optimum conditions.

Another important feature in a successful reforming process is the matter of hydrogen production and/or consumption. The cost of hydrogen is quite high and it is, therefore, essential that there be no net consumption of hydrogen in the process. Investigation has shown that hydrogen is necessary in most reforming processes to prevent the formation of carbon or carbonaceous matter on the catalyst. Deposits of carbon or carbonaceous matter on the catalyst usually decrease the effective surface area of the catalyst with the corresponding decrease in catalyst activity. The accumulation of carbon or carbonaceous matter on the catalyst can reach the point where the effectiveness of the catalyst is so low that the catalyst has to be regenerated, or in a non-regenerative process the catalyst has to be replaced.

As hereinbefore mentioned the presence of hydrogen in a reforming process will suppress the formation of carbon or carbonaceous matter on the catalyst and within limits the higher the ratio of the number of moles of hydrogen to the number of moles of hydrocarbon in the reaction zone, the more effective the hydrogen will be toward suppressing the formation of said carbon or carbonaceous matter on the catalyst.

Prior to this invention the hydrogen to hydrocarbon ratio has been kept high by recycling the hydrogen formed in the process and recycling at a high enough rate to prevent these formations. This recycling has certain inherent disadvantages. First, the recycling is done at the usual high process pressures which requires that all of the additional process equipment be built to withstand such pressures and secondly, the recycling requires compressors of sufficient capacity to maintain the required hydrogen flow and these compressors must also be able to withstand the process pressures. Besides the initial cost of the compressors, there is also the added cost of power and maintenance. Also in the event of a power failure to the compressors, the stopping of the recycle gas flow may cause carbon or carbonaceous matter to form on the catalyst to such a degree that the process may be rendered inoperable unless the catalyst is regenerated or replaced. The carbon or carbonaceous material may, in fact, build up to such a degree on the catalyst that said catalyst cannot be regenerated in a normal manner if at all. For these reasons it is highly desirable to eliminate the recycle gas system and necessary appurtenances, but it is still necessary to maintain a sufficient flow of hydrogen through the reforming reactors to prevent or suppress the formation of carbon or carbonaceous matter on the catalyst. By the use of my invention it is possible to eliminate the recycle gas system and still maintain a high hydrogen to hydrocarbon ratio in the reforming reaction zone by contacting a portion of the gasoline fraction to be reformed with essentially the entire said hydrogen rich gas stream.

In most reforming processes the aromatization is effected at conditions that are usually more severe than is necessary because the accompanying reactions that are desired may require more severe conditions. This is especially true of temperature because the aromatization reaction is highly endothermic and causes a rapid decrease in temperature through the catalyst bed and, therefore, in order to maintain a high average temperature throughout the catalyst bed it is necessary to keep the inlet temperature very high. Temperatures higher than necessary are undesirable because they promote the formation of carbon or carbonaceous matter on the catalyst and the yield of aromatics will also be decreased since the high temperatures will crack naphthenes that would otherwise be converted to aromatics if more moderate conditions existed. In my invention such undesirable results are avoided by carrying out a greater part of the aromatization reaction first with the other reforming reactions carried out in subsequent reactors.

One of the main purposes of the aromatization reaction as utilized in my invention is to produce hydrogen for the further processing of the gasoline fraction and it is not necessary that all of the naphthenes present in the charge stock be converted into aromatics which allows the aromatization reaction to be effected under mild conditions. The hydrogen gas formed in the aromatization step of the process may contain some hydrogen sulfide which may be formed from organic sulfides in the charge. If desired this hydrogen sulfide may be removed from the gas stream before the gas stream is used in the reforming step. The hydrogen sulfide may be removed by any satisfactory method such as passing the gas through a liquid absorbent such as caustic soda, tri-potassium phosphate, sodium phenolate, etc., or the gas stream may be scrubbed free of hydrogen sulfide by a countercurrent treatment with the hydrocarbon oil or one commonly used commercial method uses di-ethanol amine as the scrubbing medium.

In a broad embodiment the present invention relates to a process for reforming a gasoline fraction which comprises subjecting said gasoline to contact at aromatizing conditions with a suitable aromatizing catalyst, separating the liquid product from the hydrogen rich gas mixture formed in this step, splitting the liquid product into a plurality of streams each of which is separately commingled with essentially the entire said hydrogen rich gas stream, and separately subjecting each resulting combined stream to contact at reforming conditions with a suitable reforming type catalyst.

In one embodiment the present invention relates to a process for reforming a gasoline fraction which comprises subjecting said gasoline to contact at aromatizing conditions with a suitable aromatizing catalyst, separating the liquid product from the hydrogen rich gas mixture formed in this step, splitting the liquid product from this aromatization reactor into a plurality of streams, commingling one of the streams with essentially the entire hydrogen rich gas stream and subjecting this mixture to contact at reforming conditions with a suitable reforming type catalyst, separating the liquid product into a liquid stream and a hydrogen rich gas stream and commingling the entire resulting hydrogen rich gas stream with another of the plurality of liquid streams from the aromatization reactor, separately subjecting this mixture to contact with a suitable reforming type catalyst, separating the resulting reforming product liquid stream and a resulting hydrogen rich gas stream and subsequently commingling with and separating from each of the remaining of the plurality of aromatized streams a resulting hydrogen rich gas stream whereby each of said plurality of streams undergoes separate contact with a reforming catalyst at desired reforming conditions in the presence of a hydrogen rich gas stream passing serially and cumulatively through each catalyst contacting step.

In a specific embodiment the present invention relates to a process for reforming a gasoline fraction which comprises, subjecting said gasoline to contact at aromatizing conditions with an alumina platinum catalyst followed by a separation of the liquid products into a plurality of streams, each of which is separately commingled with the hydrogen formed in the aromatizing step, and subsequently contacting such mixture at reforming conditions with an alumina-platinum-halogen catalyst, with each of said contacts being effected under separately controlled conditions.

In a more specific embodiment the present invention relates to a process for reforming a straight run gasoline fraction which comprises subjecting said gasoline to contact at aromatizing conditions with the catalyst comprising alumina and from about .01% to about 1% by weight of platinum followed by separation of the liquid product into a plurality of streams, each of which is admixed with hydrogen formed in the aromatizing step of the process, and subsequently contacting such mixture at reforming conditions with the catalyst comprising alumina and from about .01% to about 1% by weight of platinum and from about 0.1% to about 8% by weight of combined halogen.

The platinum-alumina aromatization catalyst or the platinum-alumina-halogen reforming catalyst used in my process generally comprises the metal deposited on a support. The platinum may be composited with the carrier in any suitable maner. A particularly satisfactory method is to commingle a chloro-platinic acid solution with the support and then subject the composite to thermal treating in the presence of hydrogen in order to convert the chloride to the metal. The amount of metal deposited upon the support can vary from about .01% to about 1% on the dry basis. In preparing the platinum-alumina-halogen catalyst, the halogen is preferably incorporated in the alumina prior to the addition of the platinum compound. A preferred method of adding the halogen is in the form of an acid, such as hydrogen fluoride, hydrogen chloride, hydrogen bromide, and/or hydrogen iodide. The concentration of halogen in the finished catalysts will be within the range of from about 0.1 to about 8% by weight of the alumina on a dry basis. The catalyst in the aromatization step of the process may contain a halogen also, but it will be present in a lower concentration than the halogen content of the catalyst used in the reforming step of the process.

As herein set forth, the aromatization reaction effected in the presence of the platinum-alumina catalyst will produce substantially no carbon, or at least a very low quantity of carbon on the catalyst and, therefore, the catalyst can be used for long periods of service. This is true because the aromatization reaction is carried out under very mild conditions to produce hydrogen for the further processing of the gasoline fraction and it is not necessary that the conversion of naphthenes to aromatics be completed in this reactor. On the other hand, the reaction in the reforming reactors can be carried out under more severe conditions without fear of excessive carbon formation on the catalyst because by using my invention, a sufficiently high hydrogen rate is maintained in these reactors to suppress the formation of carobn on the catalyst. After long use, however, it may be necessary to regenerate the catalyst. This can be done by treating the catalyst with air or other oxygen-containing gas to burn the carbonaceous deposit therefrom. It is preferred to control the regeneration temperature not to exceed about 1000° F.

As hereinbefore set forth the gasoline fraction is subjected to aromatizing in the first step of the process. Any suitable catalyst may be employed. A particularly preferred catalyst comprises alumina and from about .01% to about 1% by weight of platinum. This catalyst is a particularly effective aromatization catalyst.

In another embodiment of the invention the alumina-platinum catalyst for use in the aromatization step may contain a halogen combined therewith, but the percentage of halogen in this case is less than the percentage of halogen contained in the reforming catalyst. Other suitable, but not necessarily equivalent aromatization catalysts include alumina-chromia, alumina-molybdena, etc.

The aromatization reaction is preferably effected at a temperature within the range of from about 600° to about 950° F., a pressure of from about 500 to about 1000 p. s. i. and a weight hourly space velocity of from about 2 to about 20.

After the gasoline fraction is subjected to aromatizing in the first step of the process it is divided into a plurality of streams, and each of said streams is admixed with the hydrogen produced in the aromatization reactor according to a novel flow scheme and then subjected to reforming. Any suitable reforming catalyst may be employed within the scope of the present invention. A preferred catalyst comprises alumina, from about .01% to about 1% by weight of platinum and from about 0.1% to about 8% by weight of halogen.

The conditions in the reforming step of the process will vary with the particular charging stock, catalyst, etc., but in general it will be within the range of from about 650° to about 1000° F., a pressure of from about 400 to about 1000 p. s. i. and a weight hourly space velocity of from about 0.2 to about 5 and a hydrogen to hydrocarbon mol ratio of from about 2 to about 10 or more moles of hydrogen per mol of hydrocarbon. In this reforming step the hydrogen to hydrocarbon mol ratio depends upon the amount of hydrogen produced in the aromatization step of the process and it also obviously depends upon the number of streams the gasoline fraction from the aromatization step of the process.

If in the aromatization reactor, one mol of hydrogen is produced for one mol of hydrocarbon charged and if the hydrocarbon stream after the aromatization reactor is divided into three equal streams, then the hydrogen to hydrocarbon mol ratio in the first reforming reactor will be three moles of hydrogen to one mol of hydrocarbon. Likewise if 4 or 5 reforming reactors are used and the hydrocarbon stream after the aromatization reactor is split into 4 equal or 5 equal streams respectively, the hydrogen to hydrocarbon mole ratio in the first of the reforming reactors will be 4 to 5 moles of hydrogen to one mole of hydrocarbon respectively. By the first reforming reactor is meant the reforming reactor that the hydrogen stream passes through first after being formed in the aromatization step of the process. It is not necessary to use 3, 4, or 5 reforming reactors as mentioned above, but any number may be used depending upon the amount of hydrogen produced in the aromatization step of the process and the hydrogen to hydrocarbon mole ratio that one desires for the reaction. Likewise it is not meant to restrict the process to one wherein the plurality of streams are equal.

The amount of hydrogen that passes from one reforming reactor to the next, though substantially the same, will vary depending upon the charge to the reforming reactors, the catalyst used for reforming, the operating conditions, etc. If the stock contains a large proportion of naphthenes and the conditions in the aromatization reactor are very mild there will be continued aromatization in the reforming reactors due to continued dehydrogenation of the remaining naphthenes to aromatics as well as the dehydrocyclization of paraffins to aromatics. If the hydrocracking is mild in the reforming reactors and little hydrogen is consumed in this reaction there may be a net increase in the amount of hydrogen flowing to the next reactor. On the other hand, the charge to the reforming reactors, the catalyst used for reforming, the operating conditions, etc., may be such that there will be a net decrease in the amount of hydrogen flowing to the next reactor. The net hydrogen produced in the process may further be used in any process that requires hydrogen or it may be used as fuel, etc.

The novelty and utility of the present invention is further illustrated in the accompanying diagrammatic flow diagram which shows a particular method of conducting the reforming which incorporates several specific embodiments of the invention. For simplification some of the equipment, such as valves, pumps, heat exchangers, and similar appurtenances have been omitted in the drawing. These are well known and are not essential to the understanding of the description.

Referring to the drawing, a gasoline fraction is directed through line 1 to heater 2 wherein it is raised to the desired temperature and then is directed through line 3 into aromatizing reactor 4.

A suitable aromatizing catalyst is deposited in reactor 4 and the gasoline fraction is passed therethrough in either downward flow as illustrated, or upward flow not illustrated. In the case herein illustrated the catalyst is deposited as a fixed bed in reactor 4, but it is to be understood that the process may be effected in a fluidized type of operation, in which the catalyst and hydrocarbons are maintained in a state of turbulence under hindered settling conditions, a fluidized fixed bed type of operation in which the catalyst and hydrocarbons are maintained in a state of turbulence under hindered settling conditions but where there is no transfer of catalyst either in or out of the reaction zone, a moving bed type of process in which the catalyst and hydrocarbons are passed in either concurrent or countercurrent flow, a suspensoid type of operation in which the catalyst and hydrocarbons are passed as a slurry through the reaction zone, or in any other suitable manner of intimately contacting the reagents with the catalyst.

The aromatized products are withdrawn from zone 4 through line 5, and are passed through cooler 6 and line 7 into receiver 8. In receiver 8 substantially all the hydrogen is separated from the gasoline product. The gasoline product is withdrawn through line 9 and directed through heater 10 wherein it is raised to the desired temperature and it is then directed through line 11 which is divided into several streams 12, 13 and 14. The hydrogen in receiver 8 is withdrawn through line 15 and directed through heater 16, wherein it is raised to the desired temperature and it is then directed through line 17 and into reforming reactor 18 along with the gasoline in line 12.

In another embodiment not illustrated the hydrogen in line 15 is treated to remove the hydrogen sulfide therefrom. Reactor 18 in the case here illustrated is packed with an aromatization catalyst and the products are passed therethrough. However, any suitable manner of intimately contacting the reactants with the catalyst may be employed.

The effluent products from zone 18 are withdrawn through line 19 and directed through cooler 20 and line 21 into receiver 22. In receiver 22 substantially all the hydrogen is separated from the gasoline product. The gasoline product is withdrawn through line 23 for subsequent separation and recovery. Usually this separation will include stabilization of the gasoline to produce a final gasoline of desired vapor pressure and to thereby separate normally gaseous products.

The hydrogen in receiver 22 is withdrawn through line 24 and is directed through heater 25 wherein it is raised to the desired temperature and it is then directed through line 26 to the reforming reactor 27 along with the gasoline in line 13. The effluent products from zone 27 are withdrawn through line 28 and directed through cooler 29 and line 30 into receiver 31. In receiver 31 substantially all the hydrogen is separated from the gasoline product. The gasoline product is withdrawn through line 32 and joins the gasoline product in line 23 for subsequent separation and recovery.

In a like manner the hydrogen in receiver 31 is withdrawn through line 33 and is directed through heater 34 wherein it is raised to the desired temperature and it is then directed through line 35 and into reforming reactor 36 along with the gasoline in line 14. The effluent products from zone 36 are withdrawn through line 37 and directed through cooler 38 and line 39 into receiver 40. In receiver 40 substantially all the hydrogen is separated from the gasoline product. The gasoline product is withdrawn through line 41 and joins the gasoline product in line 23 for subsequent separation and recovery. The hydrogen in receiver 40 is withdrawn through line 42 for further use in any reaction that requires hydrogen or may be used as fuel, etc. It is thus more clearly seen from this illustration that any number of reforming reactors may be used for this process.

From the foregoing specification it can be seen that we have provided a new method for the reforming of hydrocarbons. The foregoing illustration was to show the advantages of a particular flow of the herein disclosed process. Many other illustrations differing in minor details but within the scope of this invention could be cited. Hence, the invention should not be restricted except by the terms or the spirit of the claims.

I claim as my invention:

1. A process for the conversion of a hydrocarbon distillate containing naphthenes and paraffins and boiling in the gasoline range, which comprises subjecting the distillate to catalytic aromatization, thereby forming hydrogen, separating said hydrogen from the aromatized gasoline product, splitting said gasoline product into a plurality of streams, passing each of the aromatized gasoline streams through a separate one of a plurality of reaction zones containing reforming catalyst and maintained at independently controlled reforming conditions, said zones being connected for series flow of hydrogen gas therethrough, passing said hydrogen formed in the aromatizing step through the first zone of the series in admixture with the aromatized gasoline stream supplied to this zone, separating the effluent of each of said zones into a hydrogen-containing gas and a reformed gasoline product, supplying the hydrogen-containing gas from each of said zones, except the last in the series, to the next succeeding zone of the series for passage therethrough in admixture with another of said aromatized gasoline streams, commingling the reformed gasoline products from said zones and recovering the resultant mixture.

2. The process of claim 1 further characterized in that the reforming of said aromatized gasoline streams in said reaction zones is effected under more severe conditions than the initial aromatization of said hydrocarbon distillate in the first-mentioned step of the process.

3. The process of claim 1 further characterized in that the hydrogen passing serially through said zones is heated prior to its introduction to each of the zones.

4. The process of claim 1 further characterized in that said aromatized gasoline product is split into at least three streams and said series of zones comprises a like number of catalytic reactors, each receiving one of said streams and hydrogen-containing gas from a preceding zone.

5. The process of claim 1 further characterized in that the catalyst in the aromatizing step is platinum-alumina and the catalyst in said reaction zones is platinum-alumina-halogen.

6. The process of claim 1 further characterized in that the catalyst in the aromatizing step and in said reaction zones is platinum-alumina-halogen, the catalyst in said zones containing a higher percentage of halogen than that in the aromatizing step.

References Cited in the file of this patent

UNITED STATES PATENTS

| | | |
|---|---|---|
| 2,202,401 | Rosen | May 28, 1940 |
| 2,322,863 | Marschner | June 29, 1943 |
| 2,416,894 | Barron | Mar. 4, 1947 |
| 2,573,149 | Kassel | Oct. 30, 1951 |